May 18, 1926.

J. PERRET 1,585,206

ASYNCHRONOUS MOTOR

Filed Dec. 8, 1924

Inventor:—
Joseph Perret,
By: William A. Smith, Jr,
Attorney.

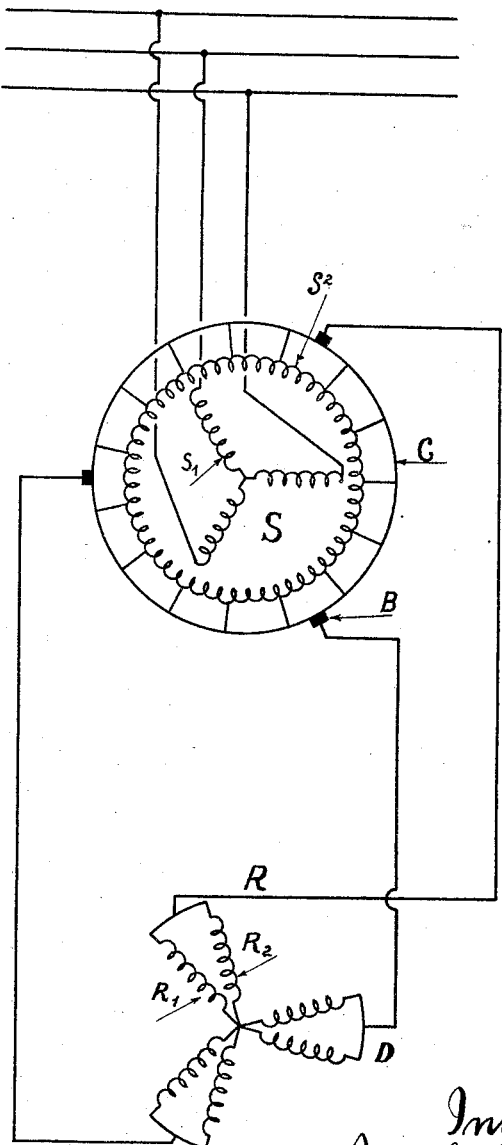

Patented May 18, 1926.

1,585,206

UNITED STATES PATENT OFFICE.

JOSEPH PERRET, OF PARIS, FRANCE, ASSIGNOR TO FORGES & ATELIERS DE CONSTRUCTIONS ELECTRIQUES DE JEUMONT, SOCIÉTÉ ANONYME, OF PARIS, FRANCE.

ASYNCHRONOUS MOTOR.

Application filed December 8, 1924. Serial No. 754,539.

This invention relates to asynchronous electric motors. It has for its object to provide an asynchronous motor possessing the following features:—high starting torque without requiring the operation of a rheostat, automatic running up to speed without alteration of connection by hand or otherwise and a power factor approximating to unity at all loads. There are thus obtained the ideal conditions for this kind of machine, and the customary slip-rings and short-circuiting device are suppressed.

According to the present invention the asynchronous motor is combined with two different characteristic arrangements, one on the rotor, the other on the stator; the object of the first arrangement is to obtain the desired starting torque; the second arrangement allows for high power factor, such as would be obtained with a separate exciter provided with a commutator.

The high starting torque is obtained by means of a duplex winding on the rotor, the feature of novelty being that the two windings are automatically connected in parallel at normal speed simply through the low reactance commutator winding without the use of any auxiliary device.

High power factor is obtained by connecting the rotor in series, as already known, with brushes rubbing on a commutator. The special original feature is the position of the commutator winding in the stator slots of the asynchronous motor, the magnetic paths of the asynchronous motor and the commutator exciter being thus brought together in the same core. As already known in an ordinary separate exciter, a primary winding may be used allowing for an autoexcitation of the polyphase commutator machine which permits compensation at any load, even at no load (without a primary winding the exciter has no action at no load, acting simply as a negative reactance when current is flowing in the rotor circuit).

In the present machine, no separate primary winding is required for exciting the magnetic path of the commutator winding circuit; the same result is obtained by permitting the main stator winding to exert a partial induction on the commutator winding. Such partial induction depends on the choice of the respective number of poles of the two windings, and on the pitch of the commutator winding; any characteristic curve may thus be obtained. If no partial induction is required (in cases where compensation at no load is not desired) two poles may be used on the commutator winding with four poles on the main stator winding.

The invention is hereafter described with reference to the accompanying drawing, in which:—

Figure 2 is a diagrammatic end view of the motor, showing the connections of the several windings.

Figure 1:
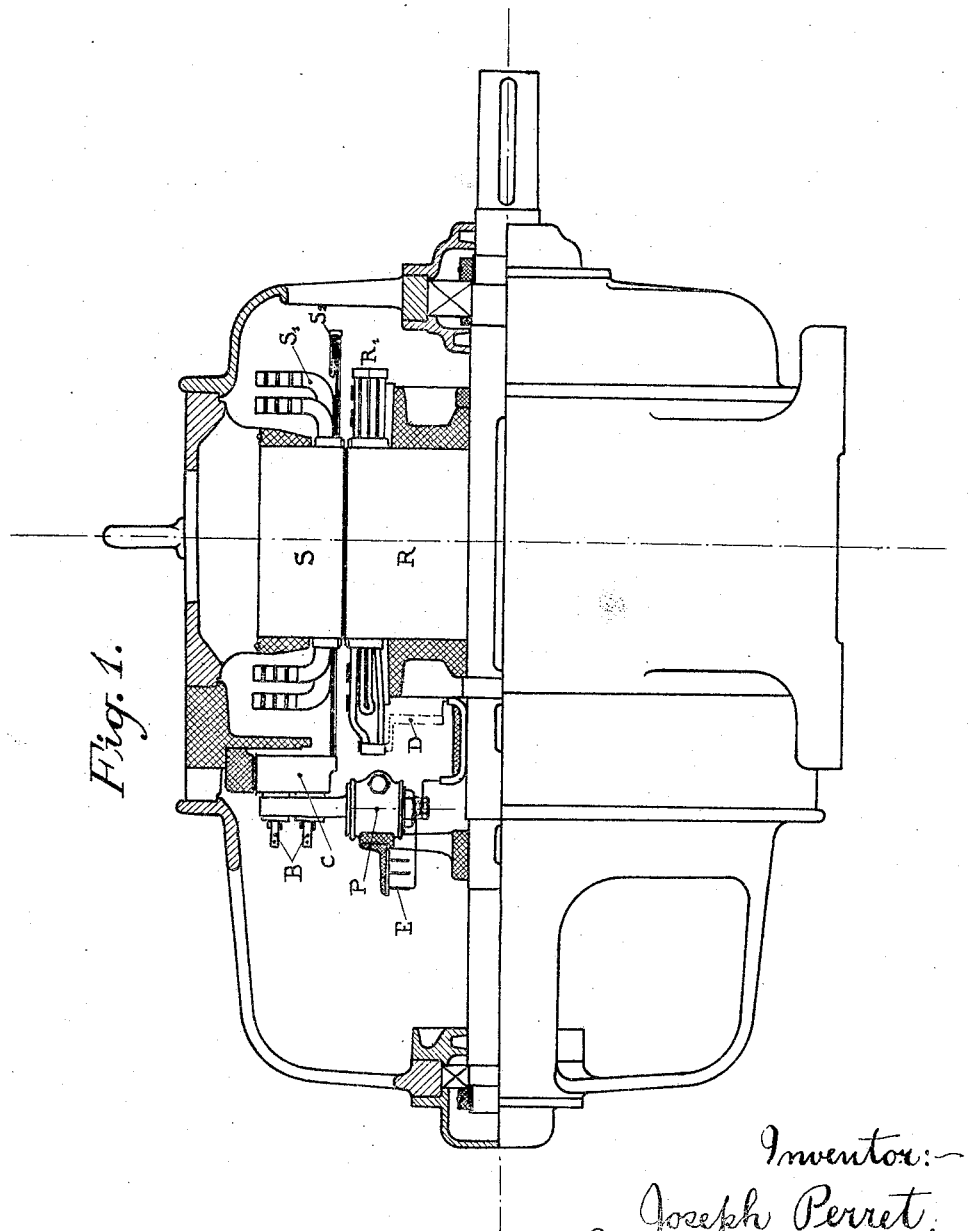
Figure 1 illustrates in part sectional elevation one form of construction of the improved motor by way of example.

In the drawings, the stator and the rotor are represented by S and R respectively.

Upon the stator S the first winding $S_1$ is the normal winding of an ordinary asynchronous motor, connected to the source of supply. The auxiliary second winding $S_2$ is located for example at the open top of the stator slots and connected to successive segments of the commutator C; in the example of construction now considered, this commutator is therefore stationary.

Upon the rotor R there are placed two distinct windings, half of the bars in each of the rotor slots belonging to one winding $R_1$, and half to a second winding $R_2$ similar to $R_1$; only one of these windings, viz. $R_1$ is visible in Figure 1. The two rotor windings are connected together by suitable connections D arranged in such a way that the two windings have an electrical pitch or angular displacement relatively to one another corresponding to an angle which lies between 0 and 180 electrical degrees; this angle, suitably selected in each particular case, determines the value of the resistance required at starting.

The points of connection between the two rotor windings constitute as it were the apices of a single winding in duplex parallel, but with an angular displacement between the two halves, so as to form in effect two ordinary star-wound motor windings with a common neutral point. Although the two windings $R_1$ $R_2$ are wound in the same slots upon the rotor, the corresponding bars or conductors of the two windings are laid in different slots, the relative positions of which differ by the angle selected to give the desired angular advance or displacement. The other extremities of the two windings are joined together in pairs (as seen in Figure 2) by the connections D, and the apices of the double winding are connected to insulated rings E, each of which is connected to one line of brushes B rubbing upon the commutator C; in the example of construction now considered, the brushes are movable and revolve with the rotor R, being carried by brush-holders P arranged in such a way that satisfactory contact of the brushes B with the commutator C is ensured during rotation.

The operation of the whole combined machine is as follows:—

At starting, the reactance of the auxiliary stator windings $S_2$ is high because of the high frequency; the two windings on the rotor R act just as if they were not short-circuited by the brushes B and the commutator C; these windings are closed one upon the other in partial opposition due to their relative angular displacement, so that the resultant electromotive force depends upon the magnitude of the electrical angle between them and the current which traverses them corresponding to the desired starting torque can be determined by the value of their relative displacement or angular advance.

In proportion as the speed increases, the reactance of the auxiliary stator winding $S_2$ decreases and the two rotor windings are progressively short-circuited by the revolving brushes B through the commutator C and the auxiliary stator coils $S_2$.

In normal running, the auxiliary stator winding and the commutator function like the armature of a polyphase-excitation generator, producing a counter E. M. F.; such a machine if suitably saturated is self-exciting and it can be arranged to compensate firstly by its own negative resistance, the resistance of the rotor circuit, and secondly by its own negative reactance, the self-induction of the asynchronous rotor leakages and that of the exciter itself.

In the machine constructed as above described, the commutator is stationary and the brushes revolve. This arrangement has the advantage of doing away with slip rings; but it is evident that without departing from the scope of the invention the stator might be made to act the part of the rotor and vice versa.

Having thus described my invention, what I claim is:—

1. An asynchronous electric motor, comprising stator and rotor members, two windings on each of said members, a commutator, and brushes revolving relatively to said commutator, one of the two windings upon one of said members being constituted by an auxiliary commutator winding, and the two windings upon the other of said members being arranged in double parallel displaced by an angle less than 180 electrical degrees and having their junction points connected to said brushes.

2. An asynchronous electric motor, comprising stator and rotor members, two windings on each of said members, a commutator, and brushes revolving relatively to said commutator, the first winding upon one of said members being a main primary winding supplied from an external source of current, the other winding upon said member being an auxiliary commutator winding electrically disconnected from said first winding, and the two windings upon the other of said members being arranged in double parallel, displaced by less than 180 electrical degrees, and having their junction points connected to said brushes.

3. An asynchronous electric motor, comprising stationary and rotating members, two windings upon one of said members, a commutator carried by said member, the first of said windings adapted to receive current from an external supply, the second of said windings having connections to said commutator, two other windings upon the other of said members, said other windings interconnected in partial opposition at points differing by less than 180 electrical degrees, brushes carried by said other member, said brushes contacting with said commutator, and means for connecting said brushes to the interconnection points of said other windings.

4. An asynchronous electric motor, comprising a stator, a main winding upon said stator, an auxiliary winding upon said stator, said main and auxiliary windings being electrically disconnected but placed in the same magnetic cores, a commutator mounted upon said stator, said commutator having its segments connected to points in said auxiliary winding, a rotor, two interconnected windings upon said rotor, brushes revolving with said rotor, said brushes rubbing upon said commutator, and means for connecting said brushes to the points of interconnection of said rotor windings.

5. An asynchronous electric motor, comprising a stator, a main winding upon said stator, an auxiliary winding upon said stator, said main and auxiliary windings having different numbers of poles, a commutator mounted upon said stator, said commutator having its segments connected to points in said auxiliary winding, a rotor, two interconnected windings upon said rotor, brushes revolving with said rotor, said brushes rubbing upon said commutator, and means for connecting said brushes to the points of interconnection of said rotor windings.

6. An asynchronous electric motor, comprising a stator, a main winding upon said stator, an auxiliary winding upon said stator, said main and auxiliary windings being superposed in the same stator slots, a commutator carried by said stator, said auxiliary winding connected to the segments of said commutator, a rotor, two distinct windings upon said rotor, half the bars in each rotor slot belonging to one rotor winding and half to the other, means for interconnecting said rotor windings at points corresponding to an angular advance of less than 180 electrical degrees, and polyphase brushes connected to said points of interconnection of said rotor windings, said polyphase brushes rubbing upon said commutator.

In witness whereof I affix my signature at Paris, France, this 26th day of November 1924.

JOSEPH PERRET.